United States Patent [19]

Klepacki et al.

[11] Patent Number: 5,588,358
[45] Date of Patent: Dec. 31, 1996

[54] TRASH HANDLING DEVICE

[76] Inventors: Frank H. Klepacki, 724 Pinecrest Ct., Hinsdale, Ill. 60521; David G. Klepacki, 1660 Stoney Point Ct., Colorado Springs, Colo. 80919

[21] Appl. No.: 554,843

[22] Filed: Nov. 7, 1995

[51] Int. Cl.⁶ .............................. B30B 15/14; B30B 1/04
[52] U.S. Cl. .................... 100/53; 53/527; 100/229 A; 100/233; 220/908; 232/43.2
[58] Field of Search .................. 100/53, 215, 229 A, 100/233; 53/527; 220/908; 232/43.2, 43.3; 141/73, 80

[56] References Cited

U.S. PATENT DOCUMENTS

| | | | |
|---|---|---|---|
| 710,837 | 10/1902 | Bridger | 100/266 |
| 987,913 | 3/1911 | Reeves | 100/266 |
| 1,062,270 | 5/1913 | Burggaller | 232/43.2 |
| 2,392,604 | 1/1946 | Mallory | 100/266 |
| 2,478,815 | 8/1949 | Forman | 100/229 A |
| 2,665,632 | 1/1954 | Kawa | 100/233 |
| 3,438,322 | 4/1959 | Marasco | 100/226 |
| 3,691,944 | 9/1972 | Boyd | 100/229 A |
| 3,838,635 | 10/1974 | Hardy | 100/229 A |
| 3,841,214 | 10/1974 | Engebretsen | 100/229 A |
| 3,901,139 | 8/1975 | Moriconi | 100/229 A |
| 3,919,932 | 11/1975 | Basuino | 100/228 |
| 4,005,648 | 2/1977 | Edwards | 100/229 A |
| 4,147,100 | 4/1979 | Dykstra | 100/229 A |
| 4,152,979 | 5/1979 | Schmidt | 100/53 |
| 4,286,515 | 9/1981 | Baumann et al. | 100/233 |
| 4,424,740 | 1/1984 | Gwathney et al. | 100/229 A |
| 4,519,308 | 5/1985 | Eberle | 100/233 |
| 4,552,061 | 11/1985 | Brutsman | 100/53 |
| 4,896,593 | 1/1990 | Slusser | 100/233 |
| 5,042,374 | 8/1991 | Klepacki | 100/229 A |

FOREIGN PATENT DOCUMENTS

| | | | |
|---|---|---|---|
| 725353 | 5/1932 | France | 100/233 |
| 2326725 | 12/1974 | Germany | 100/226 |
| 2703220 | 8/1978 | Germany | 220/908 |
| 2833632 | 2/1980 | Germany | 100/233 |
| 2921851 | 10/1980 | Germany | 100/226 |

*Primary Examiner*—Stephen F. Gerrity
*Attorney, Agent, or Firm*—Lloyd L. Zickert

[57] ABSTRACT

A trash handling device for receiving trash in a trash container enclosed within a housing where the housing has mounted therein a trash compacting device for selectively compacting the trash received in the container, and a safety lock prevents delivery of trash to the container during a compacting operation.

7 Claims, 4 Drawing Sheets

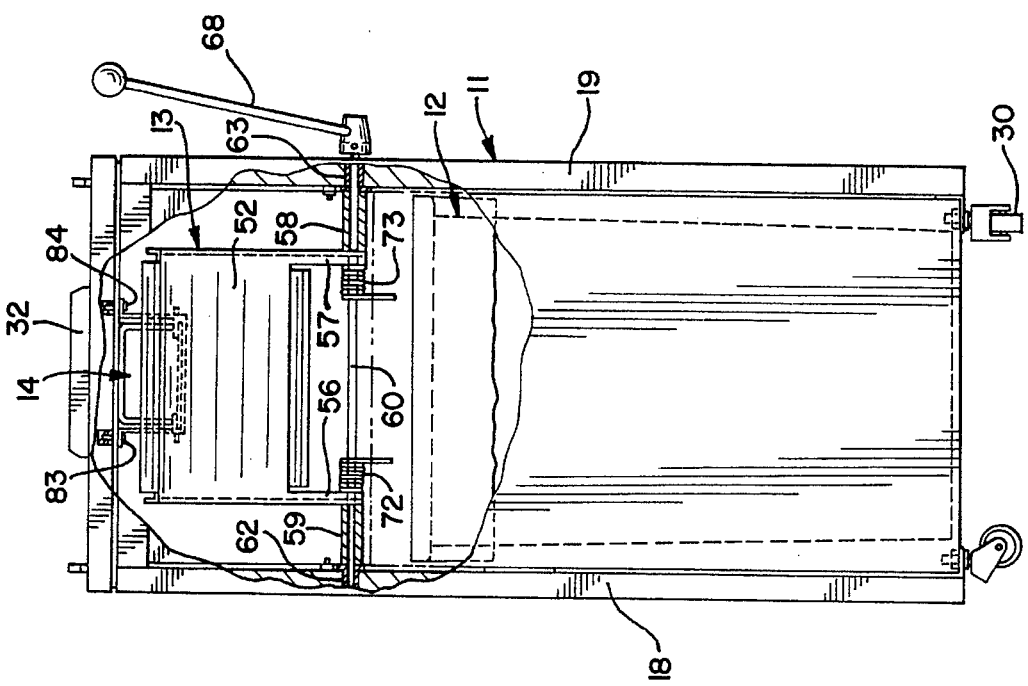
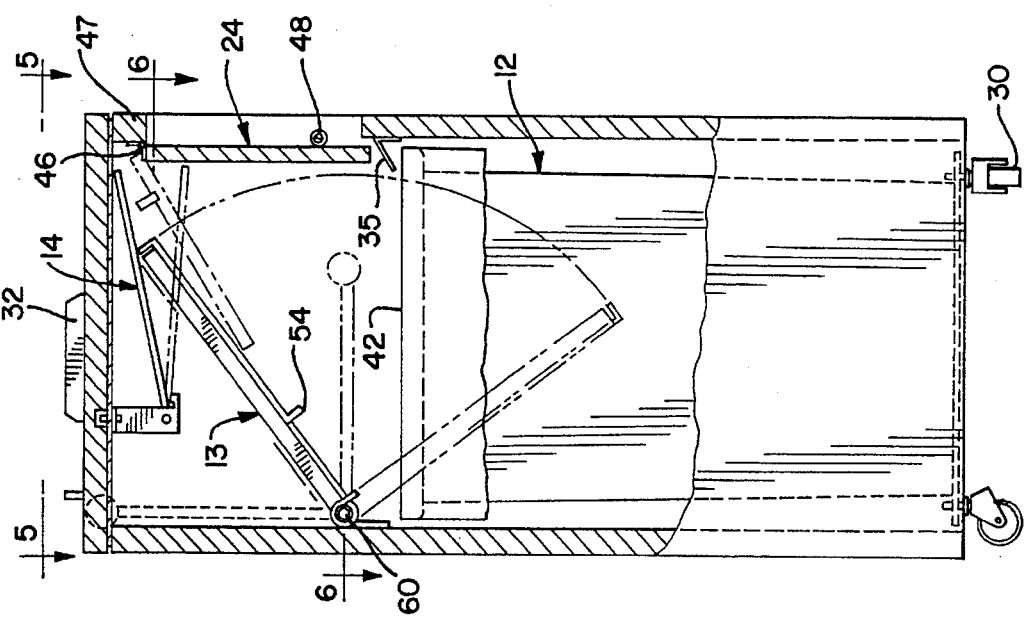

TRASH HANDLING DEVICE

This invention relates in general to a trash handling device including a trash container and a compactor for compacting the trash within the container, and more particularly to a trash handling device for use in fast-food restaurants where the patrons may deposit their trash in a trash container including the container and a compactor for compacting that trash within the container to facilitate the handling of trash.

BACKGROUND OF THE INVENTION

It is well known that trash in fast-food restaurants is generally light in weight because it includes drinking cups, cardboard food containers, wrapping papers, and molded plastic food containers. When patrons of the restaurant eat within the restaurant, it is normal for them to deposit their trash into a trash receptacle which includes a housing within which a trash container is provided and having a swinging door for access to the interior of the housing which allows the patrons to deposit trash through the swinging door into the trash container located within the housing. It is also known to provide plastic liners for the trash containers in the form of bags within which the trash is collected and thereafter removed from the trash containers when filled. Such trash handling units require the use of many plastic trash bags and labor intensive manpower to handle the bags and maintain the trash within the containers at a level that will allow them to receive further trash, so that it does not spill out onto the floor.

Further, considerable storage area is necessary in order to store filled trash bags accumulated during the servicing of a trash receptacle. A bag holding the trash in the container must be removed from the container, closed and tied off and replaced with another empty bag. Then the filled bag is removed to a disposal service area for storage until a garbage service removes the trash. Because of the rapid buildup of trash, manual handling of filled trash bags and a large storage area must be provided to accommodate the filled trash bags.

Heretofore, it has been well known to provide trash handling devices which include compactors for trash containers such as shown in U.S. Pat. No. 5,042,374. However, the problem with the trash compactor in this patent is that the trash inlet door of the housing can be opened during at least a portion of the compacting function, thereby endangering workers. Further, the lever and handle mechanism for operating a compactor is located on the top of the housing of the device which is objectionable since this location interferes with the use of the top of the device for the storage of reusable trays and can be easily operated by customers.

SUMMARY OF THE INVENTION

The present invention is in an improved trash handling device for receiving trash and compacting trash of the light-weight and "airy" type, such as produced in a fast-food restaurant, and which greatly facilitates the handling of trash, including the storage of trash prior to being picked up by a garbage collector. The trash would include paper and plastic cups, paper and plastic containers, paper wrapping materials, straws, napkins, together with perhaps a minor amount of garbage, all of which can be easily compacted in plastic bags, and thereafter transferred to a storage area.

The trash handling device of the invention includes the well known housing presently used for trash handling wherein a trash container would be provided within the housing. The trash container would be include plastic liner or bag within the container so that trash would go directly into the bag. The housing includes a swinging trash input door into which the trash can be delivered by a patron of the restaurant to fall by gravity into the trash container.

More particularly, the trash handling device of the present invention includes a housing very much like those used in trash receptacles presently used in fast-food restaurants wherein it includes a box-like structure having opposed side walls, a rear wall, a bottom wall and a top wall, with the front wall being made up of a door for opening for removing and replacing the trash container, and a swinging trash inlet door or panel that a patron would operate to deliver trash to the trash container within the housing. Further, the housing of the present invention includes a handle on one of the side walls for manually operating the compactor that is otherwise mounted entirely within the housing. The compactor includes a compacting plate carried on a shaft that is pivotally mounted to the side walls of the housing. The shaft extends through one side wall so that a lever can be mounted on the shaft for use in pivoting the shaft and the compacting plate to compact trash in the container. Thus, the compactor is operated by a worker by the lever at the side wall of the housing.

The device of the present invention is unique in that it includes a safety lock apparatus for preventing the opening of the swinging trash delivery door when the compactor is in a compacting cycle. The safety lock mechanism is automatically operated once the compactor plate is swung from its rest position and into its compacting cycle.

It is therefore an object of the present invention to provide a new and improved trash handling device for use in minimizing trash buildup by providing a compactor which compacts the trash within plastic bags received in a trash containers.

Another object of the present invention is to provide a trash handling device having a compactor wherein delivery of trash into the trash container is precluded during a trash-compacting operation, thereby preventing a person from reaching into the housing through the trash delivery door during compacting of the trash in the container.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 3 is a side elevational view of the trash handling device of FIGS. 1 and 2 looking at the side opposite to where the compactor lever is mounted with a portion of the housing broken away to view the interior and showing the compactor plate in rest position and the lock means in unlock position in solid lines, and the compactor plate swung into the container and the safety lock means in locking position to prevent the swinging of the trash door for delivery of trash into the container in phantom;

FIG. 4 is a front elevational view of the device of the present invention with a part of the housing broken away and illustrating the trash compactor plate in the upper rest position and showing the lock means in unlocking position so that the swinging trash door can be opened to deliver trash into the trash container;

DESCRIPTION OF THE INVENTION

Figure 1:
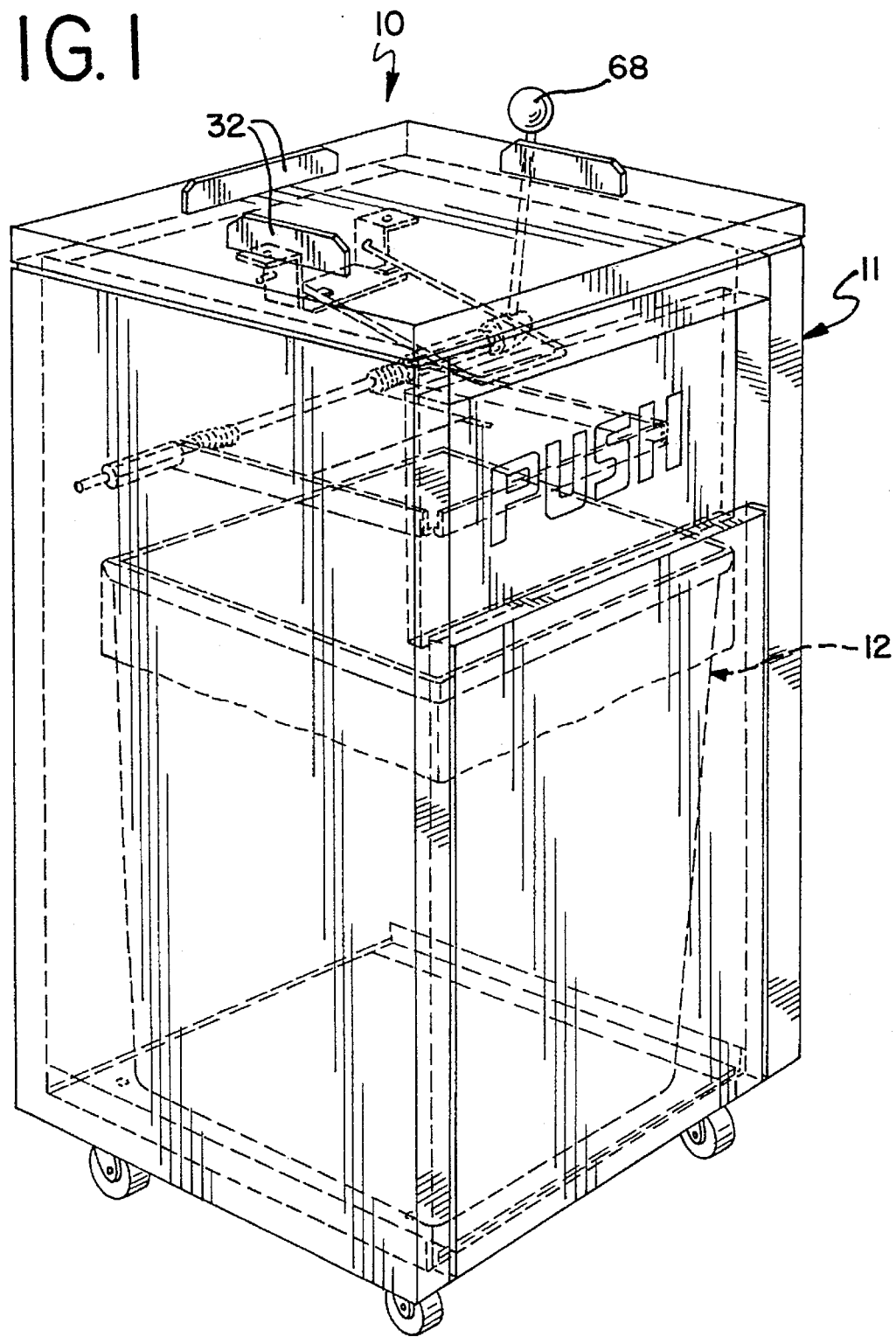
FIG. 1 is a perspective view of the trash handling device of the present invention showing parts within the housing in phantom and illustrating the compacting plate in an intermediate position during its compacting cycle which causes the safety door lock to prevent the trash delivery door from being opened.
Figure 2:
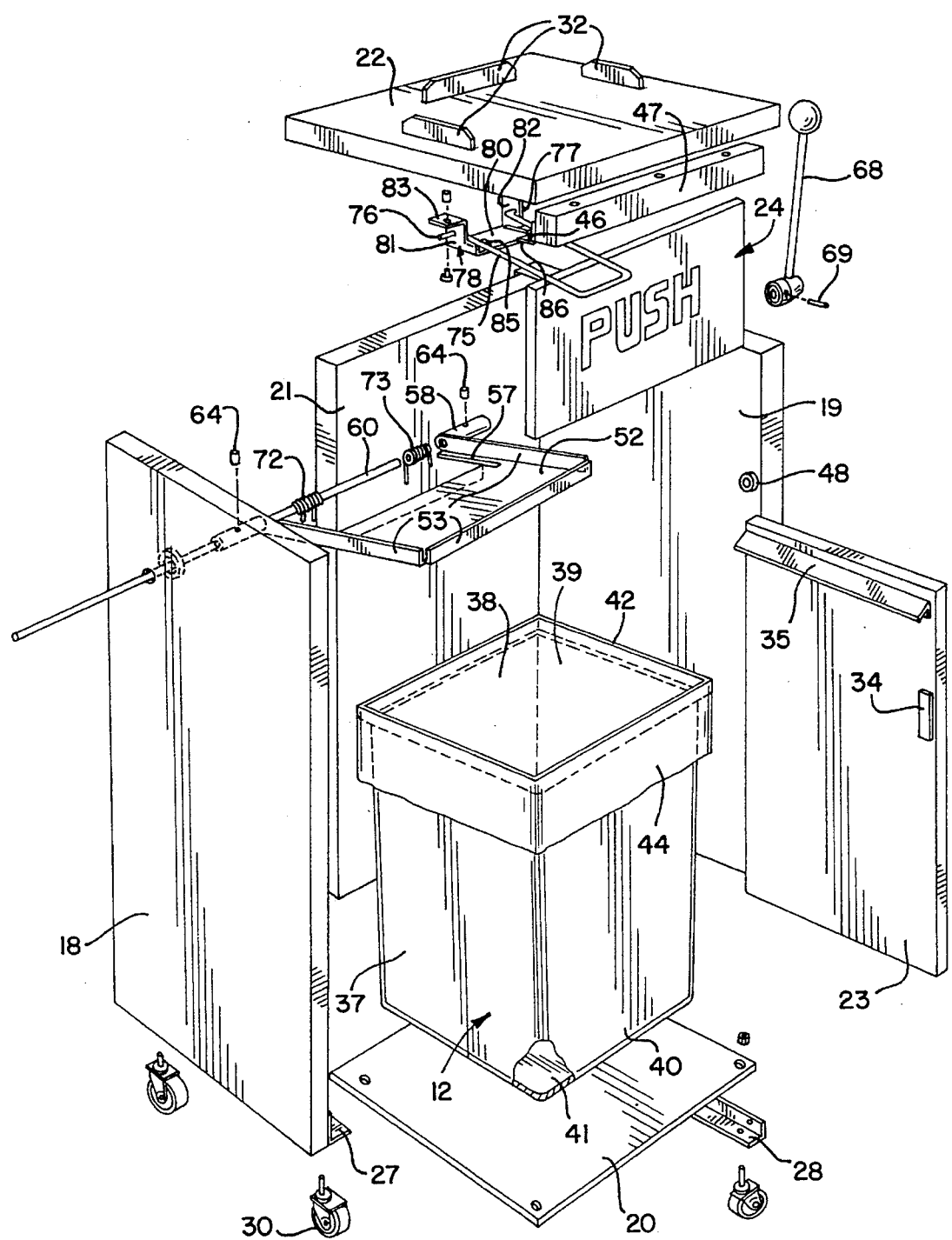
FIG. 2 is an exploded perspective view of the trash handling device of FIG. 1.
Figure 5:
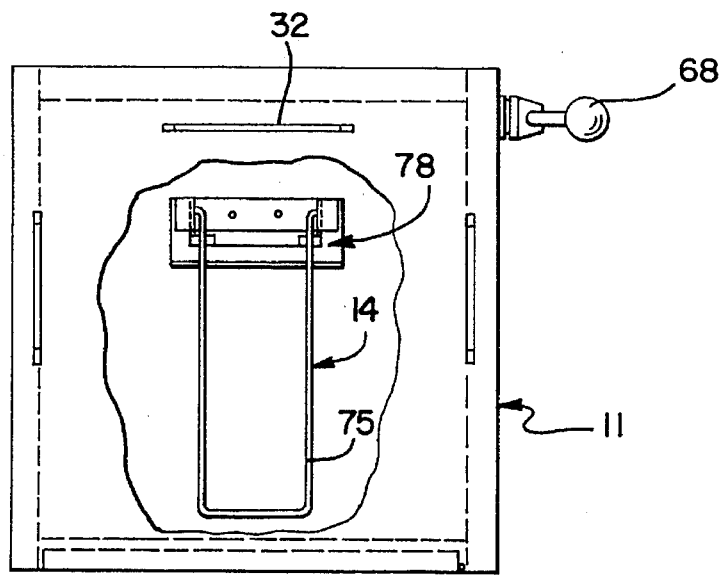
FIG. 5 is a top plan view of the trash handling device housing with a part broken away to illustrate the lock mechanism for locking the door in closed position when the compactor is in operation and looking in the direction of line 5—5 of FIG. 3.
Figure 6:
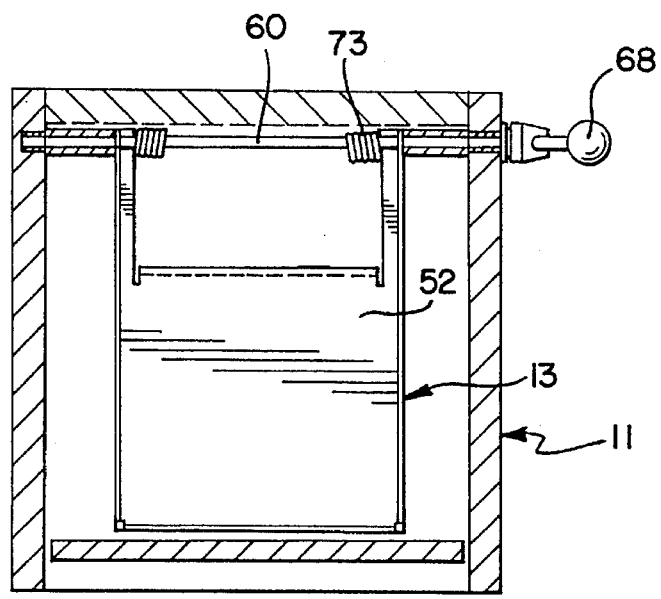
FIG. 6 is a transverse sectional view taken substantially along the lines 6—6 of FIG. 3.

Referring now to the drawings, the trash handling device of the present invention, generally indicated by the numeral 10, includes a housing 11 in which a trash container 12 is received for collecting trash such as would be produced in a fast-food restaurant. As already mentioned, this trash would include crushable cups of plastic or paper, crushable boxes, crushable cartons, paper wrappers, straws, and other packaging materials for food as normally used in fast-food restaurants. Compaction of trash within a bag received by the trash container 12 is accomplished by a compactor 13 that also functions to control the locking mechanism 14 which assures that the access door to deliver trash to the container remains in closed position during the compaction cycles.

The housing 11 is an upstanding generally rectangular shaped housing which includes opposed side walls 18 and 19, a bottom wall 20, a back wall 21, a top wall 22, a front access door 23 that allows opening of the housing for servicing the trash container 12, and a swinging trash delivery door 24 that is pushed open by a patron delivering trash to the trash container. As seen in FIGS. 1, 3 and 4, the trash container 12 fits within the housing and is supported on the bottom wall or floor 20 of the housing. Angle iron supports 27 and 28 are mounted on the inside surface of the side walls 18 and 19 at the lower edges thereof and on which the bottom wall 20 is supported. Further, a plurality of casters 30 are suitably mounted at the bottom of the housing to the angle iron supports 27 and 28 to facilitate the mobility of the entire trash handling device so that it can roll along the floor and be easily moved between different positions as desired.

It will also be noted that the upper side of the top wall 22 includes three guide members 32 for the purpose of enhancing the stackability of trays placed on the top wall by the patrons after disposing of the trash on those trays.

The door 23 is suitably hinged to the side wall 19 at one side and provided with a suitable latch mechanism for maintaining the door in closed position once the trash container has been placed within the housing and on the floor of the housing. While any suitable type of latch mechanism may be used, it may be of the well known magnetic type, and the keeper plate for such a magnetic latch is shown on the door at 34.

A guide member 35 is mounted on the inside of the door 23 along the top edge to provide a guide for trash to go directly into the trash container after it has been delivered through the trash access door 24 and prevent trash from falling between the container and door 23. The disposition of this guide 35 is illustrated particularly in FIG. 3, where it is seen that it overlies the top of the container when the door is in closed position.

The trash container 12 is of a standard plastic molded type and includes four upstanding walls 37, 38, 39 and 40 extending from a bottom wall 41. A formed reenforcing edge 42 is disposed at the upper ends of the side walls which not only reenforces the container but also provide a ledge to grasp the container for moving it in and out of the housing. The container is sized as shown in FIGS. 3 and 4 to extend upwardly so that the reenforcing edge 42 is disposed just below the door guide 35 when the door 23 is closed, as seen in FIG. 3. A plastic bag 44 is received by the container and sized so that the upper end of the plastic bag can be folded over the outer side of the upper part of the container as illustrated during the time the container and the bag receive trash.

The trash access or delivery door 24 is rectangular in shape and hingedly mounted by a hinge 46 to a hinge bar 47 that is secured to the front underside edge of the top wall 22. A stop 48 is mounted on the inside of the side wall 19 to prevent the door 24 from swinging outwardly and thereby only allowing it to swing inwardly, as illustrated in FIG. 3. While it is not necessary to spring-bias the door to the closed position, as shown in FIG. 3, as the door will gravitationally swing to the closed position when not being forced to swing inwardly, it could be appreciated that a spring hinge could be provided if desired. It will also be appreciated that the door 24 is dimensioned to facilitate a person to push it open either by means of a tray or by their hands very easily and define an opening in the housing that facilitates the delivery of trash into the housing and into the trash container.

The compactor 13 includes a compacting plate 52 sized to fit within the upper open end of the trash container when swung downwardly, as shown in FIG. 3. The compacting plate 52 may be made of metal or plastic but is preferably made of metal to provide the necessary strength to assure repeated compacting cycles without deforming the plate. The compacting plate includes reenforcing ribs 53 at the periphery which extend upwardly and a reenforcing rib 54 at the rear edge facing downwardly. Extending rearwardly from the compacting plate at each side thereof are extensions 56 and 57 and which have bushings 58 and 59 mounted thereon that receive a shaft 60. The opposite ends of the shaft are mounted in bearings 62 and 63 carried by the opposed side walls 18 and 19. Suitable roll pins or keys 64 are provided to lock the bushings 58 and 59 to the shaft 60 so that the compactor turns with the shaft 60. The shaft 60 protrudes outwardly from the side wall 19 and has mounted thereon a lever or handle 68 which is locked to the shaft by means of the pin 69 so that actuation of the handle 68 will cause actuation of the compacting plate 52.

Coil springs 72 and 73 are received on the shaft and provided with arms that coact with the back wall 21 of the container and the extensions 56 and 57 of the compacting plate to normally bias the compacting plate 52 into its rest position, as shown in FIG. 3, or in the up position of the path of the swinging door 24. When it is desired to start the compacting cycle, it is only necessary to grasp the handle 68, pull it forward to cause rotation of the shaft 60 and pivotal movement of the compacting plate 52 from the rest position shown in solid lines in FIG. 3 to a position like that shown in phantom lines which would perform a compacting of the trash within the trash container.

In order to prevent a person from opening the trash door 24 during a compacting cycle, the safety lock mechanism 14 automatically goes into lock position upon the initiation of a compacting cycle so that until the compacting plate is back in the position illustrated in solid lines in FIG. 3, the swinging trash door 24 cannot be opened. This safety lock mechanism 14 includes a U-shaped wire locking member 75 having stub shaft sections 76 and 77 that are freely received in holes formed in a bracket 78 mounted on the underside of the top wall 22. Bracket 78 includes a base plate 80 having upwardly extending legs 81 and 82 at each side and which terminate in mounting pads 83 and 84. Suitable fasteners are provided to secure the mounting pads 83 and 84 to the underside of the top wall 22. Stub shafts 76 and 77 are received in holes formed in the legs 81 and 82 and the fit is such that the holes in the legs merely serve as bearing members for the wire locking member 75. Further, stop members 85 and 86 are provided on the legs 81 and 82 for limiting the downward movement of the wire locking member 75. When the locking wire moves to locking position as shown in phantom in FIGS. 1 and 3, it will gravitationally swing or pivot downwardly to the locking position, and then the forward end of the wire will sit behind the door 24 and prevent it from being swung open, thereby locking it in closed position. The compacting plate 52 serves to drive the locking wire 75 into unlock position when the plate moves to its upper rest position, as shown in FIGS. 3 and 4 in solid lines.

In operation, it will be appreciated that a container will be provided in the housing with a plastic bag inserted and then the trash handling device is ready for receiving trash. Persons will be delivering trash to the container through the trash access or delivery door 24, and when the trash reaches a level sufficient that it can be compacted, an operator will grasp the handle 68 and pull it forward and downward to rotate the trash compacting plate 52 into the trash container and effect a compacting operation. When the compacting plate is rotated so that the locking bar 75 can move into locking position against the trash access door 24, it will be appreciated that the door cannot be opened. While the locking wire 75 is gravitationally operated into locked position upon being released by the compacting plate, it will be appreciated that a spring means may be provided at the pivot area of the locking wire in order to normally bias the locking wire into locked position if desired.

Accordingly, the present invention provides a unique trash handling device with a compactor that can be used to advantage in a fast-food restaurant for compacting trash and minimizing the trash buildup that is normally experienced when the trash is not compacted. Further, the compactor is built into the trash handling device in such a way that it can easily be operated.

It will be understood that modifications and variations may be effected without departing from the scope of the novel concepts of the present invention, but it is understood that this application is to be limited only by the scope of the appended claims.

The invention is hereby claimed as follows:

1. A trash handling device comprising a housing within which a trash container is received, said container having an open upper end, said housing including an access door swingable inwardly to allow trash to be delivered to said container, a compactor including a compacting plate pivotally mounted within the housing and swingable into said container to compact trash therein, lever means exterior of the housing connected to said compacting plate for selectively driving the plate into said container and compacting trash therein, means normally biasing said compacting plate to a rest position above said container and permitting said access door to freely swing inward for depositing trash in said container, and safety lock means preventing said access door from swinging inwardly when said compacting plate is moved from the rest position to prevent a person from being injured during a compacting operation.

2. The device of claim 1, wherein said housing further includes a container door through which the device may be serviced to empty the trash container.

3. The device of claim 1, wherein said safety lock means includes a blocking member pivotally mounted within the housing and gravitationally biased into a position blocking the access door from swinging inwardly and automatically driven out of blocking position by said compacting plate when the plate goes to said rest position.

4. The device of claim 3, wherein the blocking member is a U-shaped wire.

5. The device of claim 1, wherein the housing further includes top and bottom walls, opposed upstanding side walls, an upstanding rear wall, a container door opposite said back wall, and said swingable access door being disposed above said container door.

6. The device of claim 5, wherein said trash container is supported on said bottom wall, and said compacting plate is pivotally mounted to the side walls.

7. The device of claim 6, wherein said blocking member is pivotally mounted to said top wall.

\* \* \* \* \*